(12) United States Patent
Roush (10) Patent No.: US 8,417,899 B2
(45) Date of Patent: Apr. 9, 2013

(54) SYSTEM AND METHOD FOR CONTROLLING ACCESS TO SHARED STORAGE DEVICE

(75) Inventor: Ellard Roush, Burlingame, CA (US)

(73) Assignee: Oracle America, Inc., Redwood City, CA (US)

( * ) Notice: Subject to any disclaimer, the term of this patent is extended or adjusted under 35 U.S.C. 154(b) by 603 days.

(21) Appl. No.: 12/691,475

(22) Filed: Jan. 21, 2010

(65) Prior Publication Data

US 2011/0179231 A1     Jul. 21, 2011

(51) Int. Cl.
G06F 12/00        (2006.01)
G06F 12/14        (2006.01)

(52) U.S. Cl.
USPC .......................................... 711/152; 711/147

(58) Field of Classification Search .......................... None
See application file for complete search history.

(56) References Cited

U.S. PATENT DOCUMENTS

| 5,651,139 | A  | 7/1997  | Cripe et al.    |
| 6,192,483 | B1 | 2/2001  | Moiin et al.    |
| 6,658,587 | B1 | 12/2003 | Pramanick et al.|
| 6,708,175 | B2 | 3/2004  | Curran et al.   |
| 7,168,088 | B1 | 1/2007  | Matena          |
| 2004/0123053 | A1 | 6/2004 | Karr et al.    |
| 2007/0022314 | A1 | 1/2007 | Erasani et al. |
| 2008/0040626 | A1 | 2/2008 | Karr et al.    |

OTHER PUBLICATIONS

Sun Cluster Overview for Solaris OS, Sun Microsystems, Inc., Part No. 819-2968-10, Dec. 2006, Revision A.
Sun Cluster Concepts Guide for Solaris OS, Sun Microsystems, Inc., Part No. 819-2969-10, Dec. 2006, Revision A.
Architecting Availability and Disaster Recovery Solutions, Tim Read, Sun N1 Availability Engineering, Sun BluePrints On-Line—Apr. 2007, Part No. 817-5783-11, Revision 1.0, Apr. 12, 2007, Edition: Apr. 2007.
Sun Cluster Concepts Guide for Solaris OS, Sun Microsystems, Inc., Part No. 820-2554-10, Feb. 2008, Revision A.
Solaris Cluster 3.2 Software: Making Oracle Database 10G R2 and 11G RAC Even More "Unbreakable", White Paper, Sep. 2008.

*Primary Examiner* — Kevin Verbrugge
(74) *Attorney, Agent, or Firm* — Brooks Kushman P.C.

(57) ABSTRACT

A system and method for controlling access to a shared storage device in a computing cluster having at least two nodes configured as cluster members provide fencing and quorum features without using the device controller hardware/firmware so fencing can be provided with storage devices that do not support disk reservation operations, such as with non-SCSI compliant disks. A polling thread on each node periodically reads a designated storage space on the shared storage device at a polling interval to determine if its corresponding node registration key is present, and halts the node if the key has been removed. A cluster membership agent removes a corresponding node registration key from the designated storage space of the shared storage device and publishes new membership information indicating that the corresponding node has departed the cluster only after delaying for a time period greater than the polling interval.

20 Claims, 4 Drawing Sheets

SYSTEM AND METHOD FOR CONTROLLING ACCESS TO SHARED STORAGE DEVICE

TECHNICAL FIELD

The present disclosure relates to a system and method for controlling access to a shared storage device.

BACKGROUND

A cluster, or plex, is a collection of loosely coupled computing nodes each implemented by a standalone server running its own processes with the cluster providing a single client view of network services and/or applications, such as databases, web services, and file services, for example. These processes communicate with one another to form what looks like a single system that cooperatively provides applications, system resources, and data to users. Clusters may be used to provide scalability and/or highly available computing systems, i.e. systems that run even when a failure occurs that would normally make a server system unavailable. Clusters are based upon well-defined membership that can be dynamically reconfigured to add a node or exclude a node in response to a failure to provide high availability of the overall system. One or more nodes in a cluster may communicate with one or more storage devices via direct connection, over a public network, or via a private interconnect, for example. In general, a storage device provides persistent storage of large amounts of data, such as a magnetic disk or tape, an optical disk, or a solid state device. A shared storage device may be accessed by one or more nodes that are in communication with the storage device.

Because cluster nodes share data and resources, dynamic reconfiguration as a result of a communication failure should not allow a cluster to separate into sub-clusters or partitions that are active at the same time. Otherwise, a condition known as split-brain may occur where each partition "believes" that it is the only partition, and multiple partitions may attempt to modify the shared data resulting in loss of data integrity. A similar condition, referred to as amnesia, may occur when the cluster restarts after a shutdown with cluster configuration data older than at the time of the shutdown. This may result from starting the cluster on a node that was not in the last functioning cluster partition.

Split brain and amnesia may be avoided by using a quorum strategy where each node is assigned one vote and each quorum device is assigned one less vote than the total number of voting nodes connected to that quorum device. Quorum devices may be implemented by a dual hosted or multi-hosted shared disk, by an appropriate Network Attached Storage (NAS) device, or by a quorum server process running on a quorum server machine, for example. In the event of a loss of communication between or among cluster nodes resulting in partitioning of the cluster, only the partition with the majority vote count, or quorum, is allowed to continue to access to the quorum device. Nodes that are currently not active cluster members should not be allowed to modify data on the shared storage device to protect the integrity of data stored on the shared device. This feature may be referred to as fencing. A fencing subsystem may block all access to the shared storage device (both reads and writes), or may only block writes, as the primary concern is typically data integrity rather than data security.

Fencing limits node access to multihost devices by preventing write access to the disks. When a node departs the cluster (by failing or becoming partitioned, for example) fencing ensures that the node can no longer modify data on the disks. Only current member nodes have write access to the disks so that data integrity is ensured. Device services provide failover capability for services that use multihost devices. When a cluster member that currently serves as the primary (owner) of the device group fails or becomes unreachable, a new primary is chosen. The new primary enables access to the device group to continue with only minor interruption. During this process, the old primary must forfeit write access to the devices before the new primary can be started. However, when a member node departs the cluster and becomes unreachable, the cluster can not inform that node to release the devices for which it was the owner. As such, the surviving members need a strategy to take control of global devices previously controlled by a departed node to provide continued access to the surviving members.

Various fencing strategies are known. As previously described, fencing strategies may be used to prevent a fenced node from modifying or writing data to a shared device, in combination with a quorum strategy to determine which partition survives and to transfer ownership of the quorum device (s) to the surviving partition. Although design considerations can generally avoid the situation where more than one partition has the same number of quorum votes, this situation can be addressed by a device acquisition "race" to become the owner node for each quorum device. Shared storage devices that are SCSI-2 compliant use a disk reservation system that either grants access to all nodes attached to the disk (when no reservation is in place), or restricts access to a single node that holds the reservation. The disk reservation is enforced by the hardware or firmware of the disk controller generally communicated by the operating system using ioctls. Because only a single node can hold the reservation, the SCSI-2 standard generally only works well in clusters with two nodes. When a cluster member detects that the other node is no longer communicating, it initiates a fencing procedure, which triggers a reservation on all the disks that are shared to prevent the other node from accessing the shared disks. When the fenced node attempts to write to one of the shared disks, it detects the reservation conflict and panics, or shuts down, with a "reservation conflict" message. If applied to a cluster with more than two nodes, all but one node (the node with the reservation) would panic and shut down.

The SCSI-3 standard was developed to overcome various shortcomings of the SCSI-2 reservation/release approach. In particular, SCSI-3 adds feature enhancements that facilitate use of SCSI-3 compliant storage devices to be used as quorum devices. Similar to the SCSI-2 standard, the fencing features afforded by SCSI-3 are invoked by the operating system using ioctls and implemented by the device controller hardware and/or firmware. Unlike the SCSI-2 reservation/release system, Persistent Group Reservations, or PGRs, allow a host node to make a disk reservation that is persistent across power failures and bus resets. In addition, as their name suggests, PGRs allow a group of nodes in a running cluster to have concurrent access to the shared storage device while preventing access by nodes not in the cluster. While this implementation is suitable for cluster applications utilizing fully compliant SCSI-3 devices, PGR is not implemented on some earlier SCSI-3 devices, or on any SCSI-2 devices. Accordingly, algorithms utilizing PGR features, including the previously discussed quorum algorithms, may be inoperable or unreliable with such devices.

One strategy for implementing fencing and quorum features for non-PGR compliant devices emulates persistent group reservation in software by providing a number of primitives to emulate the group reservation functions otherwise implemented by the device hardware and/or firmware, such as described in commonly owned U.S. Pat. No. 6,658,587, the disclosure of which is incorporated by reference in its entirety. While this strategy is acceptable for many applications as it provides for fencing and quorum operations in clusters having more than two nodes, it continues to rely on a reservation/release type strategy that is limited to dual ported storage devices or those that are SCSI-2 compliant. Because SCSI-2 and SCSI-3 reservation related operations are used primarily for cluster applications, which represent a small portion of the storage device market, storage device manufacturers generally do not dedicate significant resources to consistently testing, supporting, and enhancing these features. In addition, some storage devices do not support SCSI-2 or SCSI-3 reservation related operations. In particular, the Serial Advanced Technology Attachment (SATA) and Solid State Drive (SSD) disks typically do not include SCSI-2 or SCSI-3 reservation related operations.

SUMMARY

A system and method for controlling access to a shared storage device in a computing cluster having at least two nodes configured as cluster members provide fencing and quorum features to support high availability without relying on reservation features of disk controller hardware/firmware or using associated operating system ioctl's.

In one embodiment, a system and method for controlling access to a shared disk in a computing cluster having at least two nodes with corresponding registration keys include a polling thread on each node that periodically reads a designated storage space on the shared storage device at a polling interval to determine if its corresponding node registration key is present. The polling thread halts the node if the corresponding node registration key has been removed and thereby prevents modification of data stored on the shared disk by the node that is no longer a member of the cluster. A cluster membership agent determines that a node should be expelled from the cluster when no heartbeat or similar communication signal is received from the node. In response, the membership agent removes a corresponding node registration key from the designated storage space of the shared storage device and publishes new membership information indicating that the corresponding node has departed the cluster only after delaying for a time period greater than the polling interval.

Systems and methods for controlling access to a shared storage device according to the present disclosure may provide one or more advantages. For example, various embodiments of the present disclosure may be used with any type of shared storage device that supports read and write operations. According to the present disclosure, fencing and/or quorum strategies may be implemented without relying on support from the storage device hardware/firmware in general, and specifically without SCSI-2 or SCSI-3 reservation related ioctl support. This facilitates use of less-expensive storage devices for shared storage, such as SATA and SSD devices, while providing high availability and robust data integrity. In addition, implementation of hardware independent fencing and quorum strategies eliminates vulnerability to storage device hardware or firmware changes for more robust system operation. Furthermore, embodiments according to the present disclosure do not require additional hardware, such as power controllers or system controllers, to power off or halt a departing node, which would otherwise necessitate customized software and management interfaces to support various implementations of such devices.

A detailed description of these embodiments and accompanying drawings is set forth below.

DETAILED DESCRIPTION

As those of ordinary skill in the art will understand, various features illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Systems and methods according to the present disclosure are illustrated and described with respect to representative embodiments in the block diagrams and flow charts of the Figures. Various operations or functions may be performed in hardware and/or software depending on the particular application and implementation and independent of the implementation illustrated and described with respect to any particular embodiment. The strategy and/or logic illustrated is generally stored as computer readable code implemented by software and related hardware. Code may be processed using any of a number of known strategies such as event-driven, interrupt-driven, multi-tasking, multi-threading, and the like. Similarly, multiple instances may be separately executed on a single node, on two or more nodes, or processing may be distributed across two or more nodes. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. Preferably, the control logic or code represented in the Figures is implemented primarily in software with instructions executed by one or more microprocessors. When implemented in software, the control logic is preferably provided in one or more computer-readable storage media having stored data representing code or instructions executed by a computer to control access to a shared storage device, such as a disk. The computer-readable storage media may include one or more of a number of known physical devices which utilize electric, magnetic, optical, and/or hybrid storage to keep source code and/or executable instructions and associated information.

Figure 1:
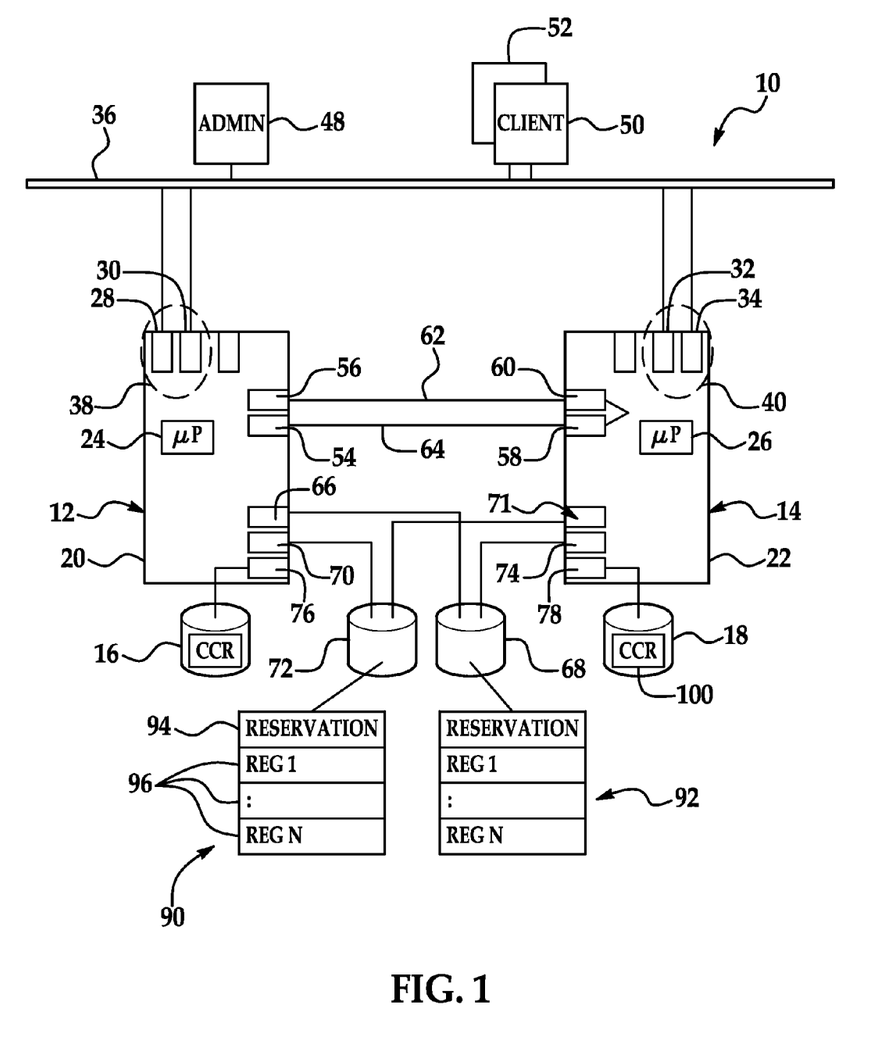
FIG. 1 is a block diagram illustrating a representative cluster hardware environment of a system or method for controlling access to a shared storage device according to one embodiment of the present disclosure.

FIG. 1 is a block diagram illustrating a representative cluster hardware environment of a system or method for controlling access to a shared storage device according to one embodiment of the present disclosure. Those of ordinary skill in the art will recognize that the representative embodiment is a pair topology. However, the system and method for controlling access to a shared storage device according to the present disclosure is generally independent of the particular cluster topology and is applicable to various other topologies, such as a clustered pair topology, star topology, and the like. Computing system 10 is configured to operate as a cluster having at least two nodes as represented by host node 12 and host node 14. During cluster configuration, each node 12, 14 is assigned a unique node identification or registration key (not shown), which may be represented by a 64-bit binary value, for example. Each host node 12, 14, may include one or more local disks 16, 18 as well as various removable storage media, such as tapes and CD-ROMs (not shown), and one or more shared storage devices 68, 72 as described in greater detail below. Local disks 16, 18 are only connected to a single corresponding node 12, 14 via a corresponding interface 76, 78, respectively, and are therefore not highly available as they are not protected against node failure. Local disks 16, 18 may be accessible from a non-local node if they are designated as global devices with mirroring used to prevent data stored on global devices from becoming inaccessible if a local node fails. As those of ordinary skill in the art will appreciate, additional nodes (not shown) may also be included in the cluster that do not have direct access to shared storage devices 68, 72, but that access one or more shared storage devices 68, 72 or local disks 16, 18 indirectly using the cluster file system.

Local disks 16, 18 are connected to associated interface cards 76, 78 of computers 20, 22, respectively. Local disks 16, 18 provide persistent storage of various operating system and application program files and information. In one embodiment, local disks 16, 18 each contain a cluster configuration repository (CCR) 100 that identifies nodes that are allowed to be part of an operational cluster as determined by the administrator during cluster configuration. The CCR may be implemented as a private, cluster-wide, distributed database for storing information that pertains to the configuration and state of the cluster. The CCR may contain various types of information, such as the cluster and node names, a list of nodes that can master each disk group, parameter values for data services, paths to data service callback methods, cluster transport configuration, etc. Each computer 20, 22 reads the data stored in its respective CCR on the local disk 16, 18 during initialization to determine how to contact other cluster nodes. The local disks that host the operating system software, cluster software, or the CCR data are not shared between cluster nodes, because each node needs its own local copy of these items. When cluster membership changes, a cluster membership monitor (CMM) initiates a cluster reconfiguration that adapts the cluster to the new set of nodes that are current members of the cluster and the CCR is updated. A Cluster Configuration subsystem is used to ensure that configuration changes are communicated over the cluster interconnect 62, 64 and applied to each copy of CCR data on all nodes in the cluster using a two-phase commit routine. As such an update must be successfully completed on all cluster members or the update is rolled back.

Cluster nodes 12, 14 include a computer 20, 22 having at least one processor 24, 26 in communication with memory (not shown) and various hardware interfaces, such as network interfaces 28, 30, for example. Processors 24, 26 are preferably capable of multi-threading and/or multi-processing. Network interfaces 28, and 32, 34 are network adapters that connect computers 20,22 to public network 36. Two or more adapters 28, 30 or 32, 34 may be designated as a multipath group 38, 40, respectively, to provide redundant communication paths to public network 36. Network adapters 28, 30 and 32, 34 provide redundant communication paths for a network administrator console 48 and various clients 50, 52 to provide administrative functions and client access to the cluster resources. Network adapters may have multiple physical connections and may contain both network interfaces and storage interfaces depending on the particular application and implementation. Network multipath groups 38, 40 allow each node 12, 14 to have multiple network ports connected to the same subnet. Network multipathing software provides resilience from network adapter failure by detecting the failure or repair of a network adapter and switching the network address to and from the alternative adapter. When more than one network adapter is functional, network multipathing increases data throughput by spreading outbound packets across adapters.

As also illustrated in FIG. 1, nodes 12, 14 include adapters 54, 56 and 58, 60, respectively, for cluster-specific communications through physically independent networks 62, 64, sometimes referred to as the cluster interconnect. Nodes 12, 14 exchange a variety of information and heartbeat signals over the cluster interconnect networks 62, 64. Preferably, at least two redundant physically independent networks or paths are used to avoid a single point of failure and provide high availability for the cluster. For clusters having more than two nodes, the cluster interconnect may include one or more switches (not shown) that are located outside of the cluster nodes and that perform pass-through and switching functions. The cluster interconnect preferably uses high-speed, low-latency devices and protocols, such as Fast Ethernet, Gigabit-Ethernet, InfiniBand, or a Scalable Coherent Interface (SCI), for example, rather than a more traditional network interface card to provide high-performance cluster-private communications.

Each of shared storage devices 68, 72 is connected to at least two host nodes 12, 14 and is therefore referred to as a multihost device. Multihost storage devices allow the cluster to tolerate single-node failures and facilitate centralizing application data, application binaries, and configuration files. In the illustrated embodiment, shared storage device 72 is connected to computer 20 via interface 70 and is connected to computer 22 via interface 71. Similarly, shared storage device 68 is connected to computer 20 via interface 70 and to computer 22 via interface 74. Connection to more than one node with provisions for automatic reconfiguration, makes shared storage devices 68, 72 highly available. Volume management software may be used to arrange shared storage devices 68, 72 and designate a primary or owner node, such as node 12 or node 14, for each device. In addition, a secondary node and one or more spare nodes may be designated such that the shared storage devices 68, 72 may be reconfigured with a new primary or owner node if a failure occurs. Those of ordinary skill in the art will recognize that designation of a primary or owner node for a group device is not related to the management of a quorum device (or designation of an owner node for the quorum device) as described in greater detail herein.

In the embodiment illustrated in FIG. 1, shared storage devices 68, 72 are shared disks having disk controllers that do not support reservation related operations, such as SCSI-2 reservation/release or SCSI-3 persistent group reservation, for example. As such, the shared disks are non-SCSI compliant and may be implemented by SATA disks and/or solid-state drives (SSD), for example. Alternatively, the shared disks may be SCSI-compliant disks where reservation-related operations are not used for fencing according to the system and method for controlling access to a shared storage medium of the present disclosure. As previously described, the present disclosure does not rely on the reservation-related features that may be available in some disks to provide fencing. This provides greater robustness by not being susceptible to anomalies associated with changes in vendor specific disk controller hardware/firmware issues.

Each shared storage device 68, 72 may include a designated storage space 90 reserved for use by the operating system. The system and method for controlling access to a shared storage device of the present disclosure allocates or designates a portion of the storage space 90 to store a reservation key 94 and a plurality of registration keys 96. In one embodiment, storage space 90 comprises 65 blocks for the exclusive use of the clustering system with one block used to hold a reservation key and 64 blocks used to store registration keys of up to 64 cluster nodes. However, the particular number of blocks or size of reserved or designated storage space may vary by application and implementation. Thus, by expanding the reserved space, it is possible to accommodate a greater number of nodes in the cluster.

Figure 2:
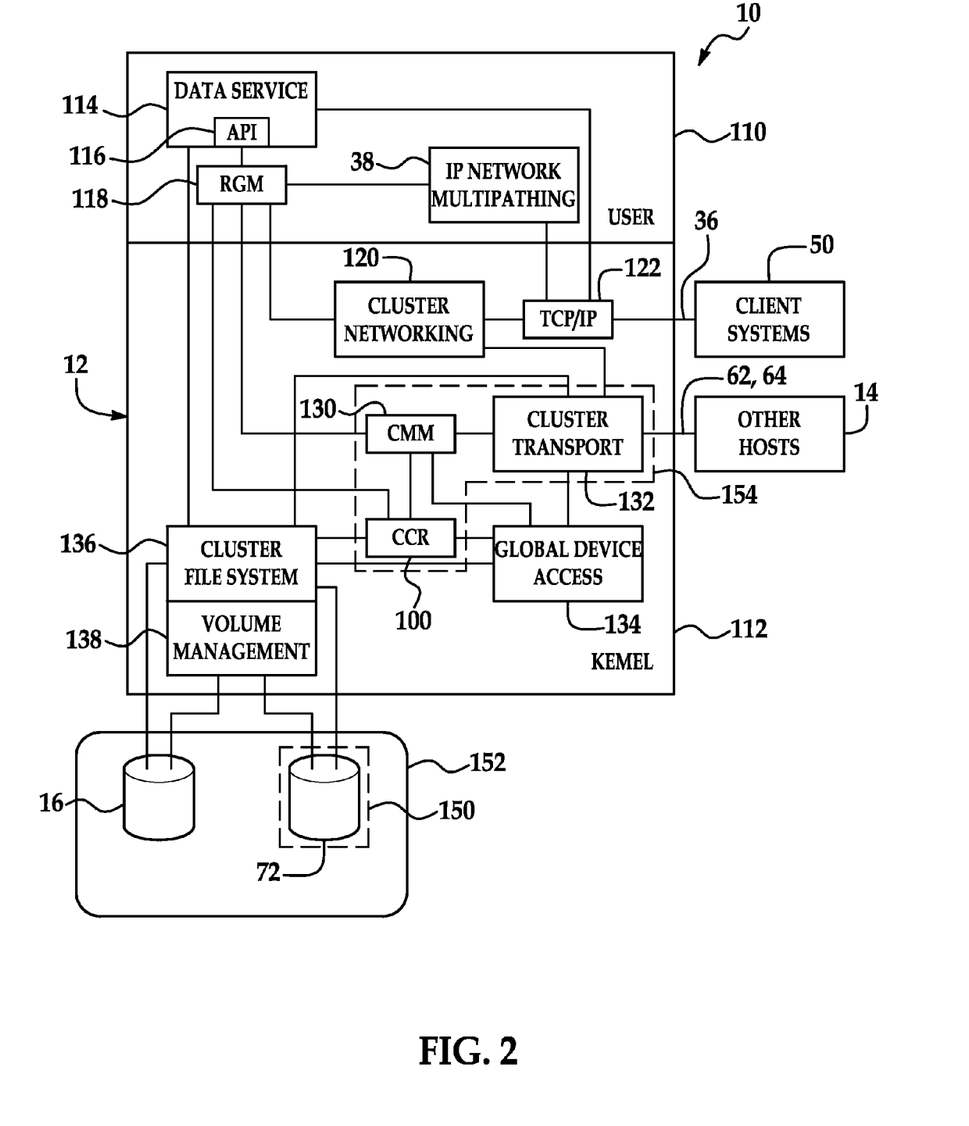
FIG. 2 is a block diagram illustrating a representative cluster software environment of a system or method for controlling access to a shared storage device according to one embodiment of the present disclosure.

Referring now to FIG. 2, a block diagram illustrating a representative cluster software environment of a system or method for controlling access to a shared storage device according to one embodiment of the present disclosure is shown. The software environment for system 10 can be grouped into user functions 110 and operating system kernel functions 112. The user functions may be performed by a data service 114 with an associated application programming interface (API) 116 that interfaces with a resource group manager (RGM) 118, which coordinates resource types, resources, and resource groups to make data service 114 highly available. The cluster administrator can configure resources into resource groups during cluster configuration so that the resources can run on different nodes or zones and fail over independently or together depending on the policy the administrator specifies for that particular application. RGM 118 brings all resources in a group online and offline together on the same node or in the same zone. When RGM 118 brings a resource group online or offline, it may run callback methods on the individual resources in the group. The nodes or zones where a resource group is currently online are called its primaries or primary nodes or primary zones. A resource group is mastered by each of its primaries and each resource group has an associated property that identifies all potential primaries or masters of the resource group, as well as configuration properties that can be set by the cluster administrator and dynamic properties, set by RGM 118 that reflect the active state of the resource group. In one embodiment, RGM 118 defines two types of resource groups: failover and scalable. A failover resource group can be online on only one node or zone at any time. A scalable resource group can be online on multiple nodes or zones simultaneously.

As also shown in FIG. 2, RGM 118 coordinates with cluster networking software 120, IP network multipathing software 38, CCR 100, and cluster membership monitor (CMM) 130. Data service 114, IP network multipathing 38, and cluster networking 120 use TCP/IP stack 122 to communicate over public network 36 with one or more client systems 50. CCR 100, CMM 130, and cluster transport 132 provide a high availability framework 154, and coordinate with global device access software 134 to provide access to the cluster file system 136 and volume management software 138 to provide cluster-wide highly available access to any device in a cluster from any node without regard to where the device is physically located. Cluster transport 132 manages cluster-private communications over cluster interconnect 62, 64 between or among other hosts 14 of the cluster.

Cluster file system 136 and volume management software 138 provide access to local disk 16 and shared disk 72. Both local disk 16 and shared disk 72 may be configured as global devices within a global namespace 152 to provide cluster-wide access from any node without regard to where the device is physically attached. However, if local disk 16 is not connected to multiple machines, it is not considered a highly available device. In general, if a node fails while providing access to a global device, the software may attempt to automatically discover another path to the device and redirect the access to that path. In the illustrated embodiment, shared disk 72 may also be a member of a disk device group containing data services resources as represented by reference numeral 150.

To ensure that data is safe from corruption, all nodes should reach a consistent agreement on the cluster membership. The cluster membership monitor (CMM) 130 may be implemented by a distributed set of agents that exchange messages over cluster interconnect 62, 64 to perform various tasks associated with cluster membership management. CMM 130 is responsible for enforcing a consistent membership view on all nodes in the cluster, coordinating synchronized reconfiguration in response to cluster membership changes, ensuring that only one cluster partition remains alive after a network partition, and ensuring full connectivity among all cluster members by ejecting or expelling unhealthy nodes from the cluster.

The main function of CMM 130 is to establish cluster membership, which relies upon a cluster-wide agreement on the set of nodes that participate in the cluster at any time. CMM 130 detects major cluster status changes on each node, such as loss of communication between or among nodes. CMM 130 relies on the cluster transport kernel module 132 to generate heartbeat signals across cluster interconnect 62, 64 to other nodes 12 of the cluster. When necessary, CMM 130 coordinates a cluster reconfiguration of cluster services in response to a failure, such as when a heartbeat signal is not received from a node for a predetermined time-out period, for example. CMM 130 receives information about connectivity to other nodes from cluster transport layer 132 and uses the cluster interconnect 62, 64 to exchange state information during a reconfiguration. After detecting a change in cluster membership, CMM 130 performs a synchronized reconfiguration of the cluster using cluster interconnect 62, 64 to exchange state information with other nodes. During reconfiguration, cluster resources may be redistributed based on the new membership of the cluster.

As previously described, a cluster can potentially break up into multiple partitions or sub-clusters due to the failure of all paths across the private cluster interconnects 62, 64 for any pair of cluster nodes 12, 14, for example. In such scenarios, CMM 130 ensures that only one of those partitions survives as the running cluster, and nodes within all other partitions are halted (panicked) to avoid data corruption on the shared storage device 68, 72. As such, CMM 130 ensures that only one set of cluster nodes functions as the cluster hosting services and applications. This may be accomplished using a quorum strategy as previously described and designated the shared storage device as a quorum device. This quorum strategy may be implemented by allocating one vote to each operating node in the cluster and allocating a number of votes for the quorum device corresponding to one less than the number of voting nodes connected to the quorum device. When a node leaves the cluster, CMM 130 determines the total votes in a cluster partition and then determines whether that cluster partition has a majority (quorum) of votes and can remain active. For example, in a cluster with four nodes connected to a shared disk, each node is allocated one vote and the shared disk is allocated three votes. Any subsequent partition would require at least four votes to remain active. Any nodes in a partition that does not have four votes would be halted.

As previously described, prior art quorum strategies relied upon reservation-related hardware/firmware support using associated operating system ioctl's to provide a fencing feature during cluster partitioning and reconfiguration to prevent data corruption. The present disclosure provides a fencing strategy that relies only upon software, which allows use of previously unsupported storage devices as quorum devices and improves reliability when used with SCSI-compliant devices designated as quorum devices by avoiding use of the device controller related ioctl's.

Figure 3:
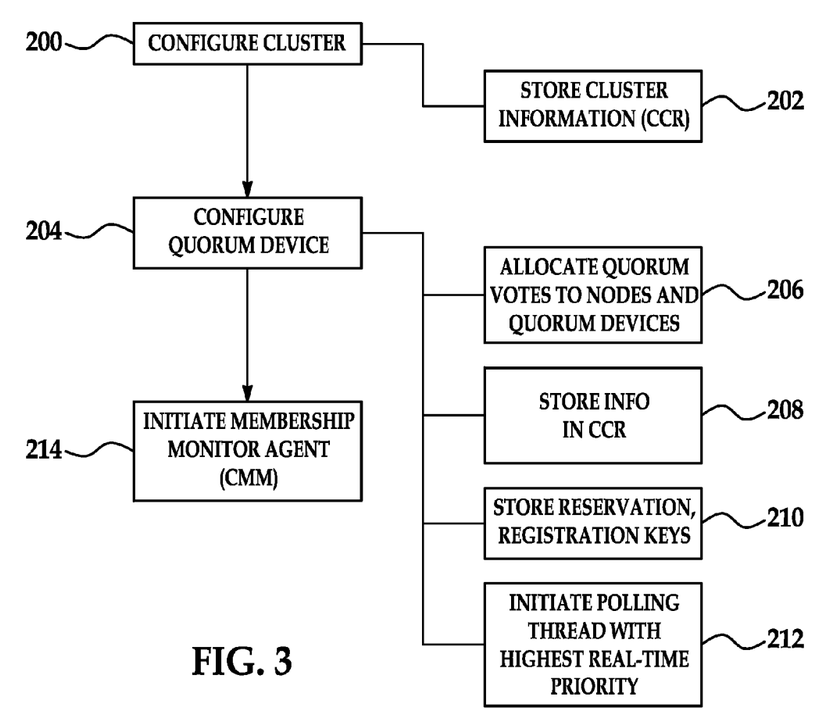
FIG. 3 illustrates various functions performed to control access to a shared storage device using hardware independent fencing and quorum strategies according to one embodiment of the present disclosure.

FIG. 3 illustrates various functions performed to control access to a shared storage device using hardware independent fencing and quorum strategies according to one embodiment of the present disclosure. An administrator configures a cluster as represented generally by block 200 by identifying nodes that will work together as a single continuously available system to provide applications, system resources, and data to users. Various information is specified and stored in local persistent storage in the cluster configuration repository (CCR) as previously described and as represented by block 202. The CCR may be updated with new cluster information after a reconfiguration process initiated by the CMM as previously described.

Block 204 of FIG. 3 represents configuration of a quorum device, which may be implemented by a shared disk, for example. Depending on the particular implementation, a quorum device may also be implemented by a quorum server or a NAS device. When implemented by a shared disk, the present disclosure provides a hardware independent system and method for fencing and quorum features that may use any shared disk that supports read and write operations, such as a SATA disk, SSD disk, or SCSI disk, for example. During configuration of a quorum device, the system assigns votes to the newly configured quorum device, based upon the quorum device connectivity to cluster nodes as represented by block 206. For typical applications, each node is assigned one vote and the quorum device is assigned one less than the total of voting nodes connected to the quorum device. However, other vote allocations are possible depending upon the particular application and implementation. The system records information about the newly configured quorum device, including its assigned votes, in the CCR as represented by block 208. The registration keys corresponding to each node in the cluster are stored in a designated space on the shared storage device as represented by block 210. The owner node registration key is also stored in a designated reservation key space of the shared device to identify that node as the owner. Alternatively, a zero value is stored in the reservation key area indicating that no reservation is present.

As also shown in FIG. 3, the cluster also creates a polling thread on each node of the cluster at the time the administrator configures the quorum device as represented by block 212. A separate polling thread is created for each quorum device. The polling thread is preferably configured with the highest real-time priority and does not use locking to avoid any possibility of a lock deadlock. As an example, in a two-node cluster with two quorum disks configured, each node will be running two separate polling threads. The newly configured quorum device is activated by a cluster reconfiguration that is driven by the cluster membership monitor agent (CMM) as represented by block 214. It is possible to configure more than one quorum device in a cluster. However, normal best practice is to configure only one or no quorum devices. A two-node cluster typically has a single quorum device. However, multiple quorum devices may be useful in some (unusual) applications.

Figure 4:
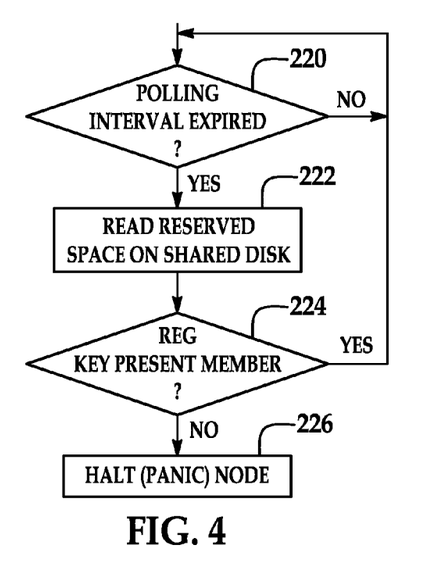
FIG. 4 illustrates operation of a representative polling thread in a system or method for controlling access to a shared storage device according to one embodiment of the present disclosure.

FIG. 4 illustrates operation of a representative polling thread in a system or method for controlling access to a shared storage device according to one embodiment of the present disclosure. The polling thread periodically wakes up upon expiration of the polling interval as represented by block 220 and reads the designated area or blocks of the shared storage device as represented by block 222. The polling thread compares the registration key of the local node with the registration keys stored on the shared storage device to determine if the local node is currently a member of the cluster as represented by block 224. If the local node registration key is present, the local node remains a member of the cluster and is allowed to write to the shared disk. The polling thread then waits for expiration of the next polling period or interval as represented by block 220.

If the polling thread finds that the registration key for the local node has been removed as represented by block 224, the polling thread determines that the local node has departed (or been expelled from) the cluster and immediately halts (panics) the local node as represented by block 226. The act of halting the node stops any further write operations to the shared disk. As such, the system and method for controlling access to the shared storage device according to the present disclosure provides fencing without the need for any controller dependent ioctl's. More specifically, reservation-related ioctl's such as those associated with SCSI-2 and SCSI-3 protocols are not required.

Figure 5:
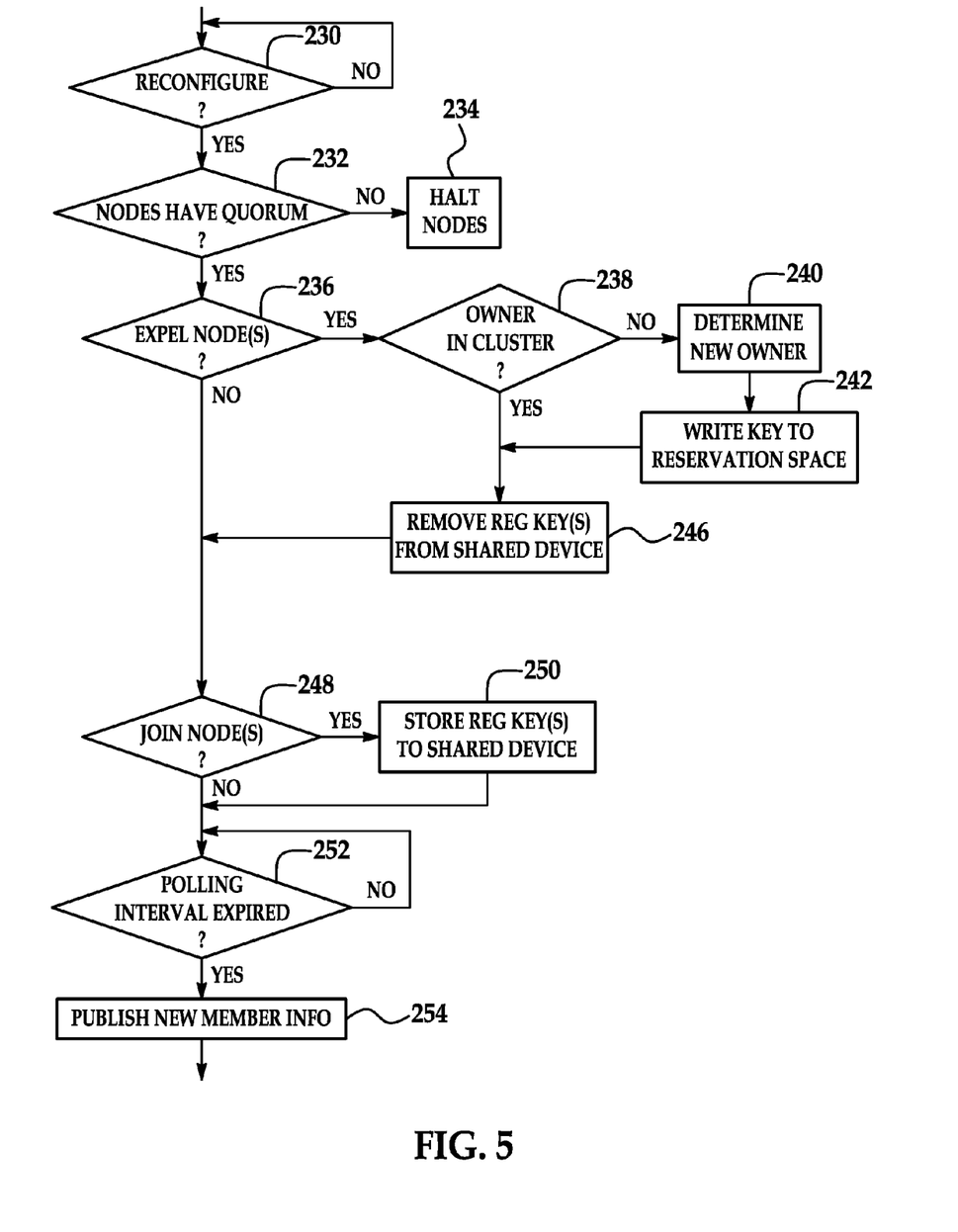
FIG. 5 illustrates operation of a representative membership monitor agent in a system or method for controlling access to a shared storage device according to one embodiment of the present disclosure.

FIG. 5 illustrates operation of a representative cluster membership monitor (CMM) in a system or method for controlling access to a shared storage device according to one embodiment of the present disclosure. As previously described, the CMM may be implemented by a distributed set of agents running on each node of the cluster that exchange messages over the cluster interconnect to perform various tasks associated with cluster membership management, some of which are represented in the flowchart of FIG. 5. The membership monitor may trigger a cluster reconfiguration in response to change in membership resulting from a loss of communication with one or more nodes, for example, as represented by block 230. The reconfiguration process adapts the cluster to the new set of nodes. Block 232 determines whether the nodes in each partition or sub-cluster have a majority of the allocated quorum votes to remain an active cluster. Nodes that are members of any sub-cluster or partition that does not have a sufficient number of votes (majority or quorum) are halted as represented by block 234. Nodes that are members of a partition that have a sufficient number of the allocated quorum votes become the active cluster and can continue to access the shared storage device.

A membership change may be triggered by determining that one or more nodes should be expelled 236, such as when communications over the cluster interconnect cannot be established with a particular node for a predetermined time-out period or number of heartbeat signals. A membership change may also be triggered by one or more nodes joining the cluster 248. When the cluster contains more than two nodes, a single cluster reconfiguration may include one or more nodes departing the cluster and/or one or more nodes joining the cluster. When a cluster node departs the cluster as represented by block 236, the node owning the quorum device removes the registration key associated with the departing node from the designated space on the shared storage device as represented by block 246 (if the owner node is a member of the cluster that has quorum as determined by block 238). If the owner node is a member, the associated node registration key is already present in the reservation key space of the shared storage device. Otherwise, if the owner node is not a member of the currently active cluster as represented by block 238, the quorum feature, or similar feature may determine a new owner node as represented by block 240. The new owner node stores its registration key in the reservation key space of the shared storage device as represented by block 242, and the new owner removes the registration key(s) of any departing node(s) from the shared storage device as represented by block 246.

As also illustrated in FIG. 5, the system stores the associated registration key for any node(s) joining the cluster in the designated or reserved space of the shared storage device as represented by block 250. The polling thread (FIG. 4) on a departing or departed node cannot be synchronized with the actions in the rest of the cluster, typically because the departed node was expelled due to a temporary or permanent loss of communication over the cluster interconnect. As such, the nodes that remain members in the cluster do not know when the polling thread on the departed node will wake-up and run. While all nodes in the cluster have the same polling interval as measured by time, the node clocks are not perfectly synchronized so the polling threads may not start at exactly the same time. As such, block 252 waits for a time period longer than the polling interval after removing the registration key(s) associated with the departed node(s) from the shared storage device before publishing the new cluster membership information to the nodes remaining in the cluster as represented by block 254. Because any node can potentially write to the shared storage device until the node determines that it is not a current member of the cluster (as determined by the polling thread), delaying the new membership announcement for longer than the polling interval guarantees that the departed node can no longer write to the shared storage device to provide data integrity.

As such, systems and methods for controlling access to a shared storage device according to the present disclosure may be used with any type of shared storage device that supports read and write operations including both SCSI-compliant and non-SCSI compliant devices. Fencing and/or quorum strategies may be implemented without relying on support from the storage device hardware/firmware in general, and specifically without SCSI-2 or SCSI-3 reservation related ioctl support. This facilitates use of less-expensive storage devices for shared storage, such as SATA and SSD devices, while providing high availability and robust data integrity. In addition, implementation of hardware independent fencing and quorum strategies eliminates vulnerability to storage device hardware or firmware changes for more robust system operation. Furthermore, embodiments according to the present disclosure do not require additional hardware, such as power controllers or system controllers, to power off or halt a departing node, which would otherwise necessitate customized software and management interfaces to support various implementations of such devices.

While embodiments of controlling energy usage in a server have been illustrated and described, it is not intended that these embodiments illustrate and describe all possible forms thereof. Indeed, various modifications to the disclosed embodiments will be readily apparent to those skilled in the art. In that regard, the words used in the specification are words of description rather than limitation, and it is understood that various changes may be made and the general principles described herein may be applied to other embodiments and applications without departing from the spirit and scope of the following claims.

What is claimed is:

1. A computing system configured to operate as a cluster, the system comprising:
   at least two nodes each assigned a corresponding registration key to operate as a member of the cluster; and
   a shared storage device in communication with the at least two nodes, the shared storage device including a designated storage space for a reservation key and for each of the registration keys associated with the at least two nodes;
   wherein each of the at least two nodes includes an associated processor executing a polling thread that periodically reads the designated storage space on the shared storage device at a polling interval to determine if its corresponding node registration key is present and halts the node if the corresponding node registration key has been removed; and
   wherein each of the at least two nodes includes a cluster membership agent that, in response to determining that a node should be expelled from the cluster, removes a corresponding node registration key from the designated storage space of the shared storage device and publishes new membership information indicating that the corresponding node has departed the cluster only after delaying for a time period greater than the polling interval.

2. The system of claim 1 wherein the shared storage device comprises a non-SCSI compliant storage device.

3. The system of claim 1 wherein the shared storage device comprises a SATA disk.

4. The system of claim 1 wherein the shared storage device comprises a solid-state drive (SSD).

5. The system of claim 1 wherein one of the at least two nodes is designated as an owner node for the shared storage device and wherein the owner node writes its corresponding node registration key to the reservation key space of the shared storage device.

6. The system of claim 1 further comprising a plurality of interconnects between each pair of the at least two nodes, each interconnect communicating node status information to other nodes in the cluster, wherein the membership monitor agent designates a node for expulsion from the cluster when no communication is received from the designated node for a predetermined time period.

7. The system of claim 6 wherein the shared storage device is designated as a quorum device and allocated a number of votes corresponding to one less than a number of nodes connected to the shared storage device and wherein each node is allocated one vote, wherein the membership monitor agent determines whether a total of votes corresponding to nodes remaining in the cluster added to votes corresponding to the quorum device constitute a majority of allocated votes.

8. The system of claim 7 wherein the owner node for the quorum device is expelled from the cluster and wherein the membership monitor agent establishes a new owner node by writing the new owner node's corresponding node registration key to the reservation key space of the shared storage device.

9. The system of claim 7 further comprising a separate polling thread for each configured quorum device.

10. The system of claim 1 wherein the polling thread is configured to execute with the highest real-time priority.

11. A method for controlling access to a shared storage device in a computing cluster having at least two nodes configured as cluster members with corresponding registration keys, the method comprising:
   storing each node's registration key in a designated registration key area of the shared storage device;
   storing one of the node registration keys in a designated reservation key area of the shared storage device to designate an owner node for the shared storage device;
   executing a polling thread on each of the at least two nodes that periodically reads the designated storage space on the shared storage device at a polling interval to determine if its corresponding node registration key is present and halts the node if the corresponding node registration key has been removed;
   executing a cluster membership agent that, in response to determining that a node should be expelled from the cluster, removes a corresponding node registration key from the designated storage space of the shared storage device and publishes new membership information indicating that the corresponding node has departed the cluster only after delaying for a time period greater than the polling interval.

12. The method of claim 11 wherein the shared storage device comprises a non-SCSI compliant device.

13. The method of claim 11 wherein the shared storage device comprises a SATA drive.

14. The method of claim 11 wherein one vote is allocated to each of the at least two nodes and a number of votes corresponding to one less than a number of voting nodes connected to the shared storage device is allocated to the shared storage device, the method further comprising:
   determining that a node should leave the cluster;
   determining whether a total of votes corresponding to nodes remaining in the cluster added to votes corresponding to the shared storage device constitute a majority of allocated votes to continue operating the cluster; and
   removing the registration key corresponding to the node leaving the cluster from the registration key area of the shared storage device.

15. The method of claim 14 wherein removing the registration key is performed by the membership agent on the owner node.

16. The method of claim 14 wherein determining that a node should leave the cluster comprises determining that a heartbeat signal from a node has not been received within a predetermined period of time.

17. The method of claim 14 wherein the owner node for the quorum device leaves the cluster, the method further comprising:
   establishing a new owner node by writing the new owner node's corresponding node registration key to the reservation key space of the shared storage device.

18. A non-transitory storage medium having computer executable instructions recorded thereon for controlling access to a storage device shared by at least two nodes of a computing cluster, the computer executable instructions comprising:
   a polling thread that periodically reads a designated storage space on the shared storage device at a polling interval to determine if a corresponding node registration key is present and halts the node if the corresponding node registration key has been removed; and
   a cluster membership agent that, in response to determining that a node should be expelled from the cluster, removes a corresponding node registration key from the designated storage space of the shared storage device and publishes new membership information indicating that the corresponding node has departed the cluster only after delaying for a time period greater than the polling interval.

19. The non-transitory storage medium of claim 18 further comprising executable instructions for:
   writing a node registration key to a reservation key space on the shared storage medium to designate the corresponding node as a primary node for the shared storage device; and
   establishing a new primary node by replacing the reservation key stored on the shared storage medium with a new node registration key associated with the new primary node during cluster reconfiguration.

20. The non-transitory storage medium of claim 18 wherein the polling thread comprises instructions for operating with the highest real-time priority.

\* \* \* \* \*